United States Patent
Bartels et al.

(10) Patent No.: US 10,882,492 B2
(45) Date of Patent: Jan. 5, 2021

(54) METHOD AND DEVICE FOR AUTHENTICATING A USER TO A TRANSPORTATION VEHICLE

(71) Applicant: VOLKSWAGEN AG, Wolfsburg (DE)

(72) Inventors: Bastian Bartels, Wolfsburg (DE); Sarah Boroske, Braunschweig (DE)

(73) Assignee: Volkswagen AG, Wolfsburg (DE)

(*) Notice: Subject to any disclaimer, the term of this patent is extended or adjusted under 35 U.S.C. 154(b) by 217 days.

(21) Appl. No.: 16/002,105

(22) Filed: Jun. 7, 2018

(65) Prior Publication Data

US 2018/0354460 A1  Dec. 13, 2018

(30) Foreign Application Priority Data

Jun. 13, 2017  (DE) .................. 10 2017 209 961

(51) Int. Cl.
  *B60R 25/24*  (2013.01)
  *G07C 9/00*  (2020.01)

(52) U.S. Cl.
  CPC ........ *B60R 25/241* (2013.01); *G07C 9/00182* (2013.01); *G07C 9/00309* (2013.01); *G07C 9/00571* (2013.01); *G07C 9/00896* (2013.01); *G07C 2009/0023* (2013.01); *G07C 2009/0042* (2013.01); *G07C 2009/00396* (2013.01); *G07C 2009/00769* (2013.01); *G07C 2009/00865* (2013.01)

(58) Field of Classification Search
  CPC .................................................. B60R 25/241
  See application file for complete search history.

(56) References Cited

U.S. PATENT DOCUMENTS

| | | | |
|---|---|---|---|
| 8,943,187 B1* | 1/2015 | Saylor | ............... H04L 67/306 |
| | | | 709/223 |
| 9,305,412 B2 | 4/2016 | Winkelman | |
| 9,960,915 B2 | 5/2018 | Ahn et al. | |
| | | (Continued) | |

FOREIGN PATENT DOCUMENTS

| | | |
|---|---|---|
| CN | 102394896 A | 3/2012 |
| CN | 104219309 A | 12/2014 |
| | (Continued) | |

OTHER PUBLICATIONS

Search Report for European Patent Application No. 18173203.3; dated Oct. 24, 2018.

(Continued)

*Primary Examiner* — Alex C Dunn
(74) *Attorney, Agent, or Firm* — Barnes & Thornburg LLP

(57) ABSTRACT

A method for authenticating a user on a transportation vehicle, wherein the transportation vehicle is coupled to an external device storing an authentication secret code and to at least one token storing a token secret code. In the method the token secret code is transmitted to the transportation vehicle when an operator control action performed with the at least one token is sensed. A new secret code is generated from the token secret code and is compared with the authentication secret code. When the new secret code matches the authentication secret code, the user is authenticated on the transportation vehicle. Also disclosed is an apparatus for authenticating a user on a transportation vehicle.

16 Claims, 3 Drawing Sheets

(56) References Cited

U.S. PATENT DOCUMENTS

| | | | | |
|---|---|---|---|---|
| 2003/0016130 | A1* | 1/2003 | Joao | B60R 25/252 |
| | | | | 340/539.1 |
| 2010/0210319 | A1* | 8/2010 | Tanaka | H04W 4/00 |
| | | | | 455/572 |
| 2014/0049366 | A1* | 2/2014 | Vasquez | G07C 9/00857 |
| | | | | 340/5.54 |
| 2015/0145648 | A1 | 5/2015 | Winkelman | |
| 2015/0166009 | A1 | 6/2015 | Outwater et al. | |
| 2016/0103991 | A1* | 4/2016 | Hsu | H04L 63/20 |
| | | | | 726/18 |
| 2017/0068956 | A1* | 3/2017 | Jones | G06Q 20/327 |
| 2017/0096123 | A1* | 4/2017 | Gennermann | E05B 81/54 |
| 2017/0140144 | A1* | 5/2017 | Bock | G06Q 20/3276 |
| 2017/0154483 | A1* | 6/2017 | Cordiner | G05B 19/00 |
| 2017/0257359 | A1* | 9/2017 | Ogawa | H04L 63/0853 |
| 2017/0297530 | A1* | 10/2017 | Kattner | G06Q 20/327 |
| 2018/0037194 | A1* | 2/2018 | Senzaki | B60R 25/257 |
| 2018/0088661 | A1* | 3/2018 | Betancourt | G01C 21/3694 |
| 2018/0134253 | A1* | 5/2018 | Zielinski | B60R 25/24 |
| 2018/0326947 | A1* | 11/2018 | Oesterling | G07C 9/00571 |

FOREIGN PATENT DOCUMENTS

| | | |
|---|---|---|
| CN | 106603470 | 4/2017 |
| DE | 4411449 C1 | 3/1995 |
| DE | 10345746 A1 | 4/2005 |
| DE | 102012204842 A1 | 10/2012 |
| DE | 102011118234 A1 | 5/2013 |
| DE | 102015215697 A1 | 9/2016 |
| DE | 102016110103 A1 | 12/2016 |
| EP | 2743868 A1 | 6/2014 |
| WO | 2007098781 A1 | 9/2007 |

OTHER PUBLICATIONS

Search Report for German Patent Application No. 10 2017 209 961.5; dated Apr. 12, 2018.

Office Action for Chinese Patent Application No. 201810599596.X; dated Aug. 27, 2020.

* cited by examiner

METHOD AND DEVICE FOR AUTHENTICATING A USER TO A TRANSPORTATION VEHICLE

PRIORITY CLAIM

This patent application claims priority to German Patent Application No. 10 2017 209 961.5, filed 13 Jun. 2017, the disclosure of which is incorporated herein by reference in its entirety.

SUMMARY

Illustrative embodiments relate to a method for authenticating a user to a transportation vehicle, wherein the transportation vehicle is coupleable to an external device storing an authentication secret code and to at least one token storing a token secret code. Illustrative embodiments further relate to an apparatus for authenticating a user to a transportation vehicle.

BRIEF DESCRIPTION OF THE DRAWINGS

Disclosed embodiments are now explained with reference to the drawings, in which.

DETAILED DESCRIPTION

Figure 1:
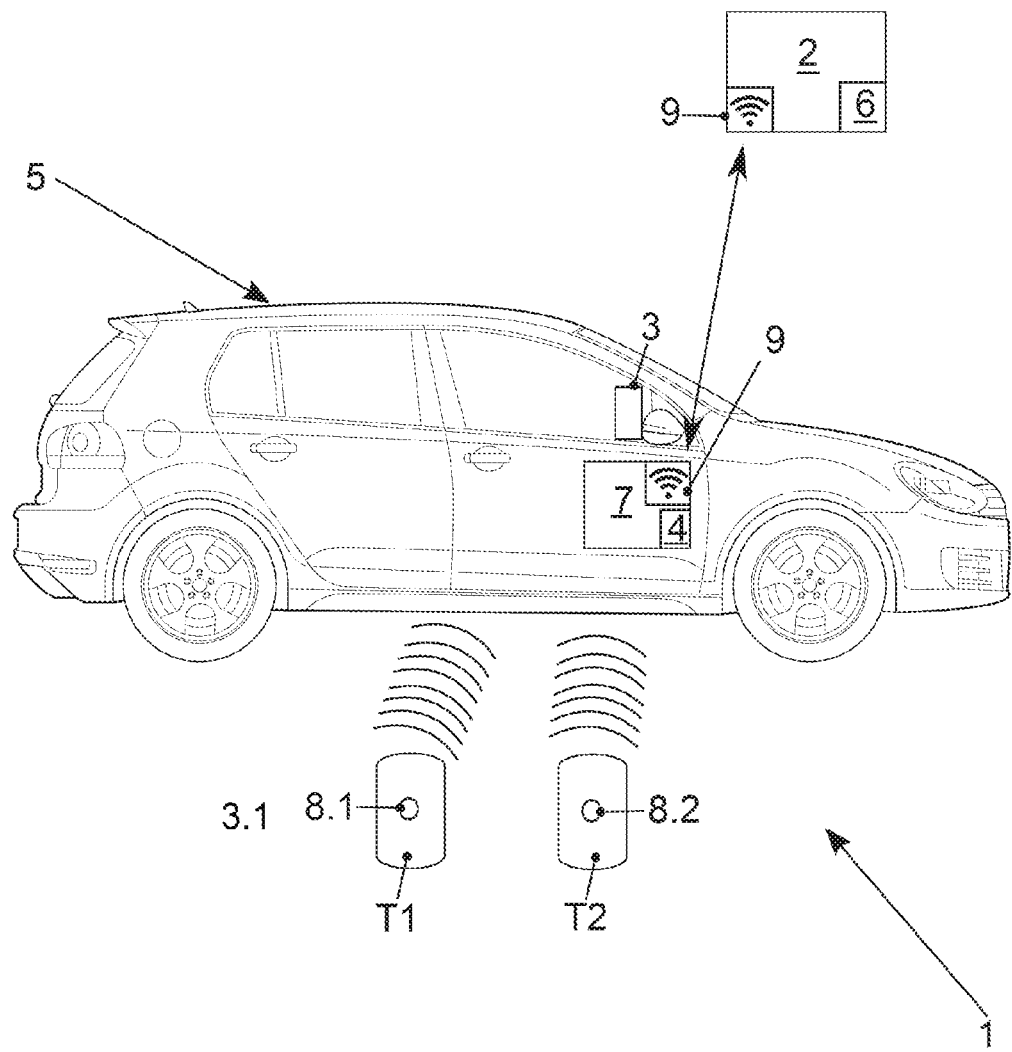
FIG. 1 shows a transportation vehicle having an exemplary embodiment of the disclosed apparatus.

Protecting a transportation vehicle from access by unauthorized parties is becoming increasingly important on account of expanding networking within the transportation vehicle and between the transportation vehicle and its environment. To prevent unwanted access to certain transportation vehicle functions by unauthorized parties, it is necessary to prevent the unauthorized parties from being able to authenticate themselves on the transportation vehicle on a one-off basis as a party authorized to manage the transportation vehicle. Security-needy functions, such as a transportation vehicle function allowing digital transportation vehicle keys to be sent to users, for example, require the user of the service to approve his identity and ownership of the transportation vehicle, that is to say to authenticate himself to the transportation vehicle. By the authentication process, the authorized user of the transportation vehicle becomes the main user of the transportation vehicle and is authorized to use and manage functions and services of the transportation vehicle. In this case, it is necessary to ensure that it is made as difficult as possible for unauthorized parties to acquire the information needed for proving identity and ownership.

DE 10 2012 204 842 A1 describes a method for authenticating a user of a transportation vehicle communication and information system. In this case, the user can register a portable device on a server. This involves registration codes being compared with one another that are stored both on the portable device and on the server.

DE 10 2016 110 103 A1 describes a method in which a request for a mobile device to pair with a transportation vehicle is picked up. The request is approved if it has been sensed that both a first and a second transportation vehicle key have been used to start the transportation vehicle a first time and a second time.

Finally, U.S. Pat. No. 9,305,412 B2 describes a method for authorizing a user to open a transportation vehicle in which an unlock button on a transportation vehicle key is operated. Only if this unlock button has been operated is it possible to input a PIN to open the transportation vehicle.

Disclosed embodiments provide a method and an apparatus that can be used to make an authentication process on a transportation vehicle more secure. Disclosed embodiments provide a method and an apparatus.

The disclosed method involves the token secret code being transmitted to the transportation vehicle when an operator control action performed with the at least one token has been sensed. A new secret code is generated from the transmitted token secret code. The new secret code is compared with the authentication secret code. If the new secret code matches the authentication secret code, the user is authenticated to the transportation vehicle. The token secret code is transmitted to the transportation vehicle confidentially in this case.

The term token is understood to mean an article that can store and transmit information for the purpose of identification and authentication. Such an article may be a mobile terminal of the user or a transportation vehicle key, for example. In this case, by way of example, a token can be coupled to the transportation vehicle by radio or via another wireless connection, for example, a W-LAN connection, a mobile radio connection or a BLUETOOTH® connection. Additionally, an external device is understood to mean a device that is not arranged in the transportation vehicle to which the user wishes to authenticate himself.

Additionally, the term authenticate is understood to mean proving the identity of the user. The disclosed method allows a user to identify himself as a legitimate user of the transportation vehicle only if he is in possession of the token. The authentication request by the user is followed by a check on the request. This means that the system checks whether the requesting user is actually the user he pretends to be. The system authenticates the user during this process. In the event of a positive outcome for the authentication, the user is granted specific rights for transportation vehicle functions and services. The user is authorized during this process.

The disclosed method allows the secret code needed for authentication to the transportation vehicle not to be able to be read if the transportation vehicle or control of the transportation vehicle is/are compromised from outside. This is because the secret code is stored not in the transportation vehicle but rather on an external device. It is first generated from the token secret code. Also, the token secret code is transmitted to the transportation vehicle only if an operator control action performed with the token has been sensed. The token secret code cannot be requested from the token by the transportation vehicle at the request of an unauthorized party. Rather, an operator control action needs to be performed on the token itself to transmit the token secret code to the transportation vehicle. If a user wants to authenticate himself to the transportation vehicle, he therefore needs to be in possession of the token. The operator control action may be the operation of an unlock button on a transportation vehicle key in this case. Alternatively, the operator control action may also be the operation of a virtual or physical button on a mobile terminal of the user.

Additionally, it is also not sufficient if a user is only in possession of the token. This is because the fact that a new secret code is generated in the transportation vehicle means that it is not sufficient for authentication if the user merely knows the token secret code. Rather, he also needs to be in range of the associated transportation vehicle. The disclosed method hampers unauthorized parties in identifying themselves as a legitimate user of the transportation vehicle to the external device independently of the transportation vehicle.

In a further disclosed embodiment of the method, the transportation vehicle is coupleable to at least two tokens, wherein a first token stores a first token secret code and a second token stores a second token secret code. The first token secret code is transmitted to the transportation vehicle if an operator control action performed with the first token has been sensed. The second token secret code is transmitted to the transportation vehicle if an operator control action performed with the second token has been sensed. The new secret code is then generated by combining the first and second token secret codes. To generate the new secret code, it is necessary in this case for multiple tokens, in particular, at least two tokens, to be operated.

To authenticate himself to the transportation vehicle, the user therefore needs to be in possession of the two tokens. If the tokens are transportation vehicle keys, the transportation vehicle owner needs to carry all transportation vehicle keys needed for authentication to authenticate himself to the transportation vehicle, and then to perform security-relevant processes. During normal operation of the transportation vehicle, the transportation vehicle owner carries only one transportation vehicle key to open and drive the transportation vehicle. If the transportation vehicle key is stolen from him, an unauthorized party is nevertheless unable to register with the transportation vehicle, since the other tokens needed for authentication are missing. The method can be extended to any number of tokens. In this case, however, a particular number of tokens should not be exceeded, to continue to provide a user-friendly method.

The token secret codes may be sequences of digits, letters and/or special characters. The token secret codes are randomly strung-together letter or digit sequences. Additionally, the token secret codes may be combinations of digits, letters and special characters strung together randomly to produce a sequence, for example. The digit sequences may be binary strings. In this case, the token secret codes are already stored in the transportation vehicle keys at the factory during manufacture of the transportation vehicle. A token secret code is in that case actually known only to the transportation vehicle key in which it is stored.

The first and second token secret codes differ from one another. This ensures that even if an unauthorized party is in possession of one of the tokens and the unauthorized party acquires the token secret code, he cannot use the latter alone for authentication.

Additionally, the new secret code can be generated from at least one token secret code by a computation operation. The computation operation is deterministic, for example. Additionally, the computation operation may be a concatenation, a permutation, an XOR function, an AND function, an application of a "key derivation function" and/or a hash value formation.

All of the computation operations can be combined with one another as desired. It is thus possible for the token secret codes to be concatenated first all and then for a hash value function to be applied to the concatenated token secret codes. Also, the token secret codes can be concatenated first of all and then permutated or permutated first of all and then concatenated. Also, a concatenation and/or a permutation can also be combined with an XOR and/or an AND function.

In a further disclosed embodiment of the method, at least one token secret code is transmitted to the transportation vehicle in an encrypted state. If the method is performed with only one token, the token secret code stored in this token is transmitted to the transportation vehicle in an encrypted state. If multiple token secret codes, in particular, two token secret codes, are transmitted, it is also possible for only one of these token secret codes to be transmitted to the transportation vehicle in an encrypted state. Alternatively, all available token secret codes can be transmitted in an encrypted state. In this case, each token secret code can be encrypted using the same key. The transportation vehicle can then distinguish between the tokens by the simultaneous transmission of the token identity, for example. Alternatively, it is also possible for each token secret code to be encrypted via a separate key. The transportation vehicle then stores the same key/the same keys for decryption. Such methods are symmetric cryptographic methods. Alternatively, the token secret codes can also be encrypted using asymmetric cryptographic methods using a public and a private key. Additionally, the token secret codes can be encrypted using all known cryptographic methods.

At least one token secret code is stored in the transportation vehicle only until the new secret code has been generated. If the method is performed with only one token, the token secret code stored in this token is thus stored in the transportation vehicle only until the new secret code is generated. The token secret code is stored in the transportation vehicle only temporarily in this case. The token secret code is therefore in a memory of the transportation vehicle only for as short a time as possible. If multiple tokens are used, it is also possible for all available token secret codes to be stored in the transportation vehicle only until the new secret code has been generated. If the transportation vehicle or a controller of the transportation vehicle is compromised, the probability of the token secret codes necessary for generating the authentication secret code being able to be read is very low.

Additionally, the new secret code can be stored in the transportation vehicle until it has been compared with the authentication secret code. This ensures that the secret code allowing authentication to the transportation vehicle is erased from the memory of the transportation vehicle again after the comparison. This ensures that the new secret code is stored in the transportation vehicle only for a short time. If the transportation vehicle or a controller of the transportation vehicle is compromised from outside, the probability of the new secret code being able to be read is very low.

In a further configuration, the new secret code is transmitted to the external device for comparison. If the new secret code matches the authentication secret code, a signal is transmitted from the external device to the transportation vehicle indicating that the user can be authenticated. The comparison then takes place not in the transportation vehicle but rather in the external device.

The new secret code is stored in the transportation vehicle only until the new secret code has been transmitted to the external device. This allows the period of time for which the new secret code that is consistent with the authentication secret code is in the transportation vehicle to be kept as short as possible. This reduces the probability of the authentication secret code being able to be read further still. Therefore, unauthorized parties are hampered from identifying themselves as a legitimate user of the transportation vehicle to the external device independently of the transportation vehicle.

In a further configuration, an altered new secret code is generated directly after or during the generation of the new secret code, wherein the new secret code is stored in the transportation vehicle only until the altered new secret code has been generated. Thus, even if the actual comparison of the altered new secret code with the authentication secret code lasts several minutes, it is not necessary to store the new secret code in the transportation vehicle for this time. Rather, the new secret code can immediately be erased again. The new secret code can be altered by virtue of its being used as an input parameter for a cryptographic function. In this case, the new secret code can be input into the cryptographic function directly after or actually when it is generated.

A message sent to the external device can be signed with the new secret code. To this end, the message to be signed and the new secret code are input into the cryptographic function together as input parameters. As a result, although the new secret code is then stored in the transportation vehicle, it cannot be read by third parties. Additionally, the new secret code can be altered by using all known cryptographic methods.

Additionally, the external device can transmit a random code to the transportation vehicle, which random code is factored into the alteration of the new secret code. Additionally, an altered new secret code is then valid only for a particular period of time to authenticate oneself to the external device as a main user. For every request from the transportation vehicle, the external device generates a new random code that is also used in the alteration of the new secret code. Then, every request from the transportation vehicle to the external device to authenticate the main user requires a different altered new secret code. Should an altered new secret code be read by an unauthorized party, it is no longer valid for a renewed request. This allows the security of the authentication process to be increased again.

Disclosed embodiments provide an apparatus for authenticating a user on a transportation vehicle. The apparatus comprises an external device, which can store an authentication secret code, and at least one token, which can store a token secret code. Additionally, the apparatus comprises a sensing device that can be used to sense an operator control action performed with the at least one token, wherein the token secret code is transmittable to the transportation vehicle if the operator control action performed with the token has been sensed. Additionally, the apparatus comprises a control apparatus coupleable to the external device and to the token, wherein the control apparatus comprises a first computation apparatus that can be used to generate a new secret code from the token secret code. Also, the apparatus comprises a second computation apparatus, which can be used to compare the new secret code with the authentication secret code, wherein if the new secret code matches the first secret code, the user is authenticable to the transportation vehicle. The disclosed apparatus is configured to implement the above-described method. The disclosed apparatus has the same benefits as the disclosed method.

The transportation vehicle is coupleable to at least two tokens, wherein a first token can store a first token secret code and a second token can store a second token secret code. In this case, the first and second token secret codes may be identical. To distinguish between the tokens, it is then possible for the token identities to be used, for example. Alternatively, the first and second token secret codes may also differ from one another.

Additionally, the external device may be an external server. In this case, the transportation vehicle is coupleable to the external server via a protected network. The transportation vehicle can connect to the external server via a W-LAN connection, a mobile radio connection or a BLUETOOTH® connection, in particular, a BLUETOOTH® LE connection. The second computation apparatus, in which the comparison of the new secret code with the authentication secret code takes place, is arranged in the server in this case. The comparison therefore takes place not in the transportation vehicle but rather on the server. In a further disclosed embodiment of the apparatus, at least one token is a transportation vehicle key. All the tokens needed for authentication are transportation vehicle keys. Alternatively, the tokens may also be mobile terminals of the user. A first token may be a transportation vehicle key and a second token may be a mobile terminal. As a result, it is not necessary for the user to carry multiple transportation vehicle keys for the authentication.

Further, the disclosed embodiments relate to a transportation vehicle having the disclosed apparatus.

Figure 2:
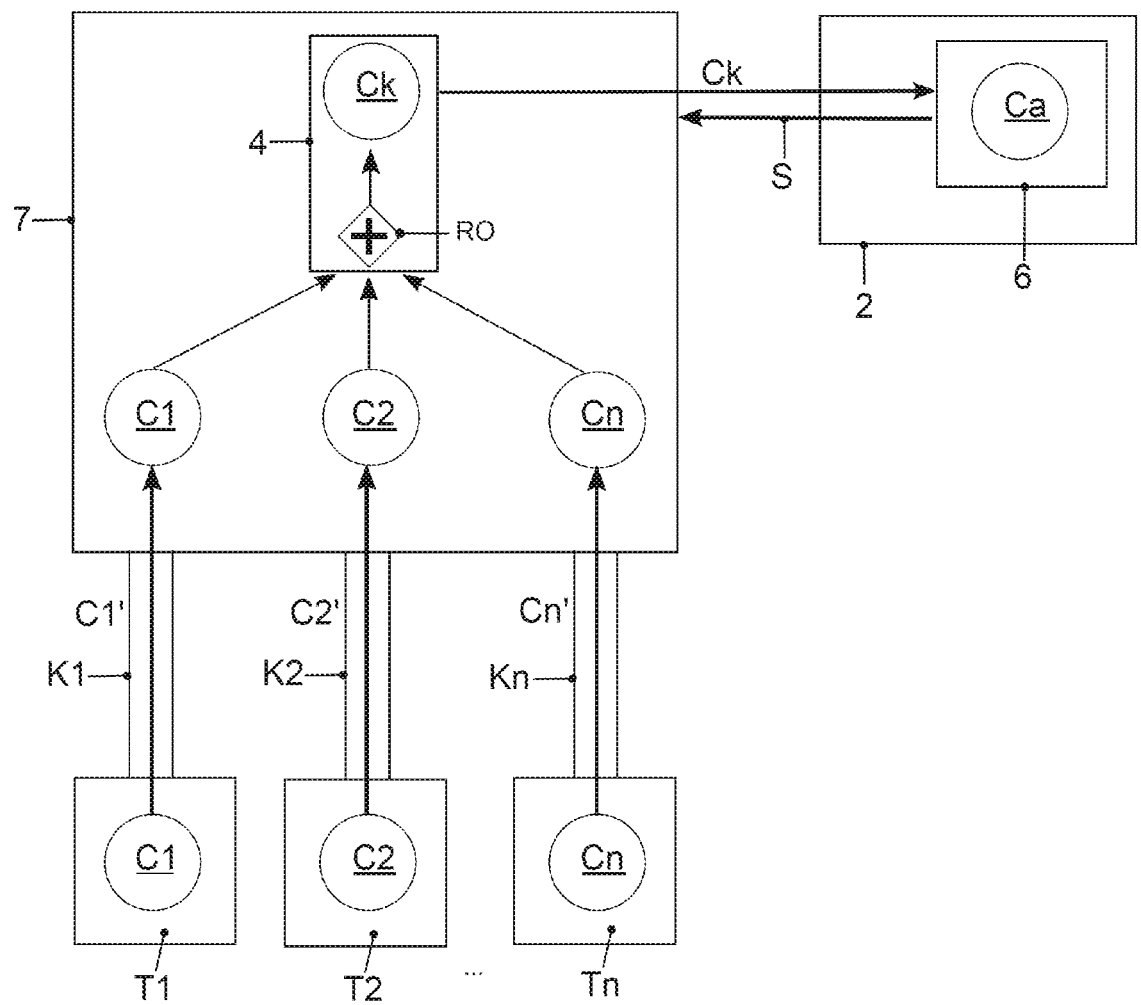
FIG. 2 shows an exemplary embodiment of the disclosed method.

Referring to FIGS. 1 and 2, a transportation vehicle 5 having an exemplary embodiment of an apparatus 1 is explained.

In this case, the apparatus 1 comprises a user interface 3, for example, configured as a touch-sensitive display panel. The user interface 3 can be used by a user to perform all the settings for the transportation vehicle 5. It is possible for basic functions and also convenience functions to be set. Also, the user can use the user interface 3 to identify himself to the transportation vehicle 5 as a legitimate user.

The apparatus 1 additionally comprises the tokens T1 and T2. In the specific case, the tokens T1 and T2 are transportation vehicle keys. The transportation vehicle keys T1 and T2 have already been taught to the transportation vehicle 5 in the factory of the transportation vehicle manufacturer. This means that the transportation vehicle 5 knows the transportation vehicle keys T1 and T2 and accepts signals transmitted by the transportation vehicle keys T1 and T2 to open the transportation vehicle doors or start the engine. The transportation vehicle key T1 comprises the unlock button 8.1 and the transportation vehicle key T2 comprises the unlock button 8.2 in this case. The unlock buttons 8.1 and 8.2 are used during normal operation to unlock the transportation vehicle 5. In this case, the user normally carries only one of the two transportation vehicle keys T1 or T2. Additionally, the unlock buttons 8.1 and 8.2 are configured as sensing devices sensing when the user operates them.

Additionally, the transportation vehicle key T1 stores a first token secret code C1 and the transportation vehicle key T2 stores a second token secret code C2. The token secret codes C1 and C2 have already been stored in the transportation vehicle keys T1 and T2 when the transportation vehicle keys T1 and T2 were taught to the transportation vehicle 5. If the user now operates the unlock buttons 8.1 or 8.2 for the purposes of authentication on his transportation vehicle 5, this is sensed and the token secret codes C1 and C2 are transmitted to the transportation vehicle 5 in an encrypted state.

The apparatus 1 also comprises a control apparatus 7. The control apparatus 7 in turn comprises a first computation apparatus 4. In this case, the first computation apparatus 4 stores computation operations RO that can be used to generate a new secret code Ck, what is known as a combination secret code, from the received token secret codes C1 and C2. The control apparatus 7 of the transportation vehicle 5 itself does not store a secret code. If the transportation vehicle 5, in particular, the control apparatus 7 of the transportation vehicle 5, is compromised, it is not possible for a secret code to be read by an unauthorized party allowing it to be named as a main user in the transportation vehicle 5.

The apparatus 1 also comprises an external device 2 configured as an external server. In the present case, external means that the server is not arranged in the transportation vehicle 5. The server 2 is arranged with the transportation vehicle manufacturer, for example. The transportation vehicle 5 is coupleable to the external server 2 in this case. The transportation vehicle 5 can connect to the external server 2 by the control apparatus 7 via at least one interface 9, for example, a W-LAN, mobile radio or BLUETOOTH® interface. The interface 9 is used to transmit the new secret code Ck to the external server 2. The external server 2 also does not know the token secret codes C1 and C2 stored in the transportation vehicle keys T1 and T2. The external server 2 stores an authentication secret code Ca that is used to authenticate a user as a main user of the transportation vehicle 5.

Also, the external server 2 comprises a second computation apparatus 6 that is used to compare the new secret code Ck with the authentication secret code Ca. The interface 9 can then be used after the comparison to send a signal S to the control apparatus 7 of the transportation vehicle 5 indicating whether or not the user can be authenticated as a main user. If the new secret code Ck and the authentication secret code Ca are identical, a signal S is sent to the control apparatus 7 of the transportation vehicle 5 indicating that the user can be authenticated as a main user. Otherwise, a signal S is sent to the control apparatus 7 of the transportation vehicle indicating that the user cannot be authenticated as a main user.

Figure 3:
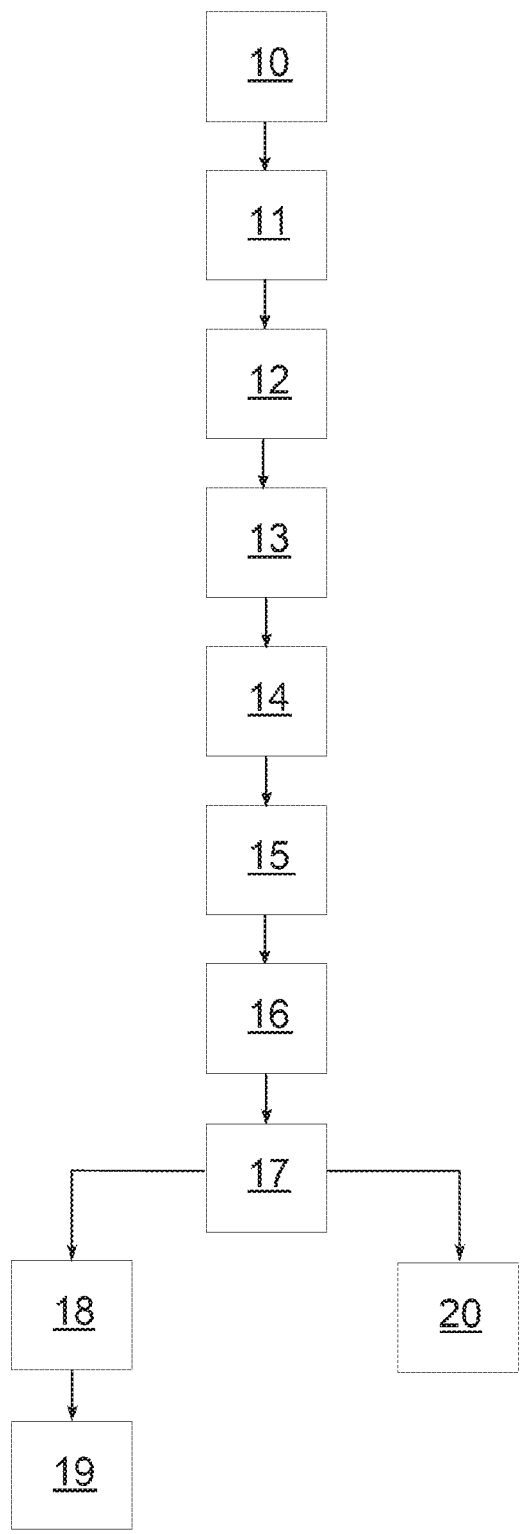
FIG. 3 shows a flowchart for the exemplary embodiment of the disclosed method.

Referring to FIGS. 2 and 3, an exemplary embodiment of the method is explained.

In operation at 10 of the method, the user registers in the transportation vehicle 5 in a known manner via the user interface 3. To register, the user inputs a user identifier and a password associated with the user identifier by the touch sensitive interface. A menu that can be used to control transportation vehicle functions appears on the display panel of the user interface 3.

In operation at 11, the user selects the menu item "Become a main user".

In operation at 12, the user is prompted to operate the unlock buttons 8.1 and 8.2 of the transportation vehicle keys T1 and T2. The order of operation is not relevant in this case. Optionally, the number of transportation vehicle keys taught to the transportation vehicle 5 is indicated to the user.

In operation at 13, it is first of all sensed that the unlock button 8.1 of the transportation vehicle key T1 has been operated. The token secret code C1 stored in the transportation vehicle key T1 is then sent to the control apparatus 7 of the transportation vehicle 5. To this end, the token secret code C1 is encrypted. The encryption sets up a secure channel K1 between the transportation vehicle key T1 and the control apparatus 7, so that it is not possible for the token secret code C1 to be tapped off during the transmission.

In operation at 14, it is then sensed that the unlock button 8.2 of the transportation vehicle key T2 has been operated. The transportation vehicle key T2 sends the token secret code C2 stored in it to the transportation vehicle 5, again in an encrypted state. The encryption again sets up a secure channel K2 between the transportation vehicle key T2 and the control apparatus 7 of the transportation vehicle 5. This prevents the token secret code C2 from being able to be intercepted and read from outside during sending.

In the present exemplary embodiment, the token secret codes C1 and C2 are identical. In general, the token secret codes C1 and C2 may also differ from one another.

The encryption of the token secret codes C1 and C2 can take place in this case using either symmetric or asymmetric cryptographic methods. In the present case, the two token secret codes C1 and C2 are encrypted using an identical key.

The encrypted token secret codes C1' and C2' are then transmitted. The token secret codes C1' and C2' differ in their token identity, however. Alternatively, the token secret code C1 is encrypted using a first key and the token secret code C2 is encrypted using a second key. The encrypted token secret codes C1' and C2' are then transmitted, differing not only in their token identity but also in the key applied to them. The key is known to the control apparatus 7, so that the latter can decrypt the secret codes C1 and C2 on the transportation vehicle.

The keys for encrypting the token secret codes may in turn be codes, for example, in this case. Alternatively, the token secret codes may also be input parameters for cryptographic functions. Additionally or alternatively still, biometric features of the user can be used to encrypt the token secret codes T1 and T2. In this case, encryption by fingerprint is conceivable. This involves the fingerprint of the user being captured by the token T1 and T2 during operation of the unlock button and compared with a derivative, stored in the transportation vehicle 5, of a binary representation of the fingerprint. The fingerprint is then embedded in a cryptographic function, for example, together with the token secret codes C1 and C2.

In the control apparatus 7, the token secret codes C1 and C2 are combined with one another by the computation operation RO in operation at 15. The new secret code Ck is generated. As soon as the new secret code Ck has been generated, the token secret codes C1 and C2 are erased from the control apparatus 4 again. The token secret codes C1 and C2 are therefore available only temporarily for the control apparatus 7, and hence the transportation vehicle 5. This prevents the token secret codes C1 and C2, if the control apparatus 7 is compromised from outside, from being able to be stored therein and hence being able to be used to generate the new secret code Ck without the unlock buttons 8.1 and 8.2 of the two transportation vehicle keys T1 and T2 having been operated beforehand.

Additionally, an altered new secret code Ck' is generated directly after the generation of the new secret code Ck. To this end, the new secret code Ck is used as an input parameter for a cryptographic function, for example. A message is transmitted to the external server. This message is signed with the new secret code Ck. To this end, the message itself and the new secret code Ck are input into the cryptographic function. This means that the new secret code Ck can then immediately be erased from the memory of the transportation vehicle 5 again. Also, this alteration of the new secret code Ck sets up a secure channel Kk for the transmission to the external server 2.

Additionally, the alteration of the new secret code Ck can use a random number that is generated by the external server 2 and transmitted to the transportation vehicle 5 in the event of a request from the transportation vehicle 5 to the external server 2. An altered new secret code Ck' of this kind is then valid for a particular period of time. An altered new secret code Ck' generated using a random number expires in the event of a fresh request, however. This is because the external server 2 generates a new random number for every request from the transportation vehicle 5. As a result, another altered new secret code Ck' is needed for each request.

In operation at 16, the altered new secret code Ck' is transmitted to the external server 2. As soon as the altered new secret code Ck' has been transmitted completely, it is erased from the memory of the control apparatus 7. The altered new secret code Ck' is therefore also available for the transportation vehicle 5 only temporarily. This likewise prevents the altered new secret code Ck' from being readable in the event of the control apparatus 7 of the transportation vehicle 5 being compromised. The external server 2 can then filter the new secret code Ck out of the altered new secret code Ck' and compare it with the authentication code Ca.

If the new secret code Ck is not altered, the secure channel Kk is set up by virtue of the new secret code Ck being transmitted in an encrypted state. This in turn prevents the new secret code Ck from being able to be intercepted and read from outside during the transmission.

The new secret code Ck is compared in operation at 17 with the authentication secret code Ca stored for the transportation vehicle 5 on the external server 2.

If the new secret code Ck and the authentication secret code Ca match, the external server 2 sends an authentication signal S to the transportation vehicle 5 in operation at 18 indicating that the user can be authenticated as a main user.

In operation at 19, all available services are enabled for the user. This relates to transportation vehicle services that are subject to a very high security level. By way of example, it is possible to send digital transportation vehicle keys to people. To prevent unauthorized parties from sending digital keys freely and thus the transportation vehicle 5 from being easily able to be stolen, it is necessary to assign a high security level to such a service.

If the new secret code Ck and the authentication secret code Ca do not match, the external server 2 sends the control apparatus 4 a nonauthentication signal S indicating that the user cannot be authenticated as a main user.

The disclosed method is extendable to any number of tokens Tn. The user is then prompted to operate the unlock button of all tokens T1 to Tn necessary for authentication. In this case, all token secret codes C1 to Cn of the n tokens are transmitted to the control apparatus 7 of the transportation vehicle 5. These are combined via the computation operation to produce the new secret code Ck.

To encrypt the token secret codes C1 and C2 and/or to generate the altered new secret code Ck', it is additionally or alternatively possible for biometric features of the authorized user to be used, as has already been explained for the encryption of the token secret codes C1 and C2.

Similarly, the disclosed method can also be performed with only one token T1. The user is then prompted only to operate the unlock button 8.1 of the token T1. Just one token secret code C1 is then transmitted to the control apparatus 7 of the transportation vehicle 5. The new secret code Ck is then generated from the token secret code C1. The new secret code Ck is then generated by hash value formation or the application of a "Key Derivation Function". Optionally, the disclosed method is performed using two tokens T1 and T2, however. This results not only in increased security but also in the method remaining user friendly. If the user has to take more than two tokens with him to the transportation vehicle 5, the risk of him forgetting a token or losing a token is increased.

Additionally, the tokens T1 to Tn may also be mobile terminals of the user or a combination of transportation vehicle keys and mobile terminals of the user. Examples of suitable mobile terminals in this case are NFC wristbands, NFC rings, NFC chains, smart watches, smart phones and/or biochips. By way of example, the token T1 may be a transportation vehicle key, while a cell phone or a portable computer of the user serves as token T2. To transmit the second token secret code C2, the user is then prompted to operate a key on his mobile terminal.

LIST OF REFERENCE SIGNS

1 Apparatus
2 External device; external server
3 User interface
4 First computation apparatus
5 Transportation vehicle
6 Second computation apparatus
7 Control apparatus
8.1, 8.2 Unlock buttons
9 Interface
10-20 Method operations
C1, C2, Cn Token secret codes
Ck New secret code
Ck' Altered new secret code
Ca Authentication secret code
K1, K2, Kn Channels
RO Computation operation
S Signal
T1, T2, Tn Tokens; transportation vehicle keys

The invention claimed is:

1. An apparatus for authenticating a user on a transportation vehicle, the apparatus comprising a control apparatus coupleable to an external device and at least two tokens, wherein the external device stores an authentication secret code, a first token stores a first token secret code and a second token stores a second token secret code, wherein
the first token secret code of the first token is received by the transportation vehicle via a secure channel,
the second token secret code of the second token is received by the transportation vehicle via a secure channel,
a first computation apparatus generates a new secret code from the received token secret codes, and
the user is authenticable on the transportation vehicle when the new secret code matches the authentication secret code;
wherein the tokens each have a sensing device that senses an operator control action performed with the respective token, and
wherein the first or second token secret code is transmittable to the transportation vehicle when the operator control action performed with the token is sensed.

2. The apparatus of claim 1, wherein a second computation apparatus is used to compare the new secret code with the authentication secret code, wherein an interface sends a signal to the control apparatus indicating whether or not the user is authenticated based on the result of the comparison.

3. The apparatus of claim 1, wherein the external device is an external server.

4. The apparatus of claim 1, wherein at least one token is a transportation vehicle key.

5. A method for authenticating a user on a transportation vehicle coupleable to an external device and to at least two tokens, wherein the external device stores an authentication secret code, a first token stores a first token secret code and a second token stores a second token secret code, the method comprising:
receiving the first token secret code of the first token by the transportation vehicle;
receiving the second token secret code of the second token by the transportation vehicle;
generating a new secret code from the received token secret codes; and
authenticating the user on the transportation vehicle in response to the new secret code matching the authentication secret code;
wherein an altered new secret code is generated directly after or during the generation of the new secret code, and wherein the new secret code is stored in the transportation vehicle only until the altered new secret code is generated.

6. The method of claim 5, wherein the first and second token secret codes differ from one another.

7. The method of claim 5, wherein the new secret code is generated from at least one token secret code by a computation operation.

8. The method of claim 5, wherein at least one token secret code is transmitted to the transportation vehicle in an encrypted state.

9. The method of claim 5, wherein at least one token secret code is stored in the transportation vehicle only until the new secret code is generated.

10. The method of claim 5, wherein the new secret code is stored in the transportation vehicle until the new secret code is compared with the authentication secret code.

11. The method of claim 5, wherein the new secret code is transmitted to the external device for comparison and a signal is transmitted from the external device to the transportation vehicle indicating that the user is authenticated in response to the new secret code matching the authentication secret code.

12. The method of claim 5, wherein the new secret code is stored in the transportation vehicle only until the new secret code has been transmitted to the external device.

13. A transportation vehicle that includes an apparatus for authenticating a user on a transportation vehicle, the apparatus comprising a control apparatus coupleable to an external device and at least two tokens, wherein the external device stores an authentication secret code, a first token stores a first token secret code and a second token stores a second token secret code, wherein
    the first token secret code of the first token is received by the transportation vehicle via a secure channel,
    the second token secret code of the second token is received by the transportation vehicle via a secure channel,
    a first computation apparatus generates a new secret code from the received token secret codes, and
    the user is authenticable on the transportation vehicle when the new secret code matches the authentication secret code;
    wherein the tokens each have a sensing device that senses an operator control action performed with the respective token, and
    wherein the first or second token secret code is transmittable to the transportation vehicle when the operator control action performed with the token is sensed.

14. The transportation vehicle of claim 13, wherein a second computation apparatus is used to compare the new secret code with the authentication secret code, wherein an interface sends a signal to the control apparatus indicating whether or not the user is authenticated based on the result of the comparison.

15. The transportation vehicle of claim 13, wherein the external device is an external server.

16. The transportation vehicle of claim 13, wherein at least one token is a transportation vehicle key.

* * * * *